United States Patent
Wakasa et al.

(10) Patent No.: US 7,223,372 B2
(45) Date of Patent: May 29, 2007

(54) NOX REMOVAL SYSTEM FOR BOILERS

(75) Inventors: Satoshi Wakasa, Matsuyama (JP); Noboru Takubo, Matsuyama (JP); Yukihiro Isshiki, Matsuyama (JP); Kouichi Masuda, Matsuyama (JP); Nobuyuki Ishizaki, Brantford (CA)

(73) Assignees: Miura Institute of Research & Development Co., Ltd, Ehime-Ken (JP); Miura Co., Ltd, Ehime-Ken (JP)

( * ) Notice: Subject to any disclaimer, the term of this patent is extended or adjusted under 35 U.S.C. 154(b) by 3 days.

(21) Appl. No.: 11/017,722

(22) Filed: Dec. 22, 2004

(65) Prior Publication Data

US 2005/0106082 A1 May 19, 2005

Related U.S. Application Data

(63) Continuation of application No. 09/800,926, filed on Mar. 8, 2001, now abandoned.

(30) Foreign Application Priority Data

Mar. 30, 2000 (JP) ............................... 2000-092582

(51) Int. Cl.
*B01D 50/00* (2006.01)
(52) U.S. Cl. ...................................... 422/168

(58) Field of Classification Search ............... 422/168, 422/169, 172, 173, 174, 198, 199; 165/87, 165/148, 186; 219/600, 618, 628, 630, 200, 219/538, 546
See application file for complete search history.

(56) References Cited

U.S. PATENT DOCUMENTS

| | | | | |
|---|---|---|---|---|
| 4,199,675 A | * | 4/1980 | Sharpless | 392/484 |
| 4,985,218 A | * | 1/1991 | DeVita | 423/235 |
| 5,233,934 A | | 8/1993 | Krigmont et al. | 110/345 |
| 5,315,941 A | | 5/1994 | Vetterick et al. | 110/345 |
| 5,543,123 A | | 8/1996 | Hofmann et al. | 423/235 |
| 5,628,186 A | | 5/1997 | Schmelz | 60/274 |
| 5,820,838 A | | 10/1998 | Tsuo et al. | 422/168 |
| 5,968,464 A | | 10/1999 | Peter-Hoblyn et al. | 423/235 |
| 5,985,222 A | | 11/1999 | Sudduth et al. | 423/235 |
| 5,988,115 A | * | 11/1999 | Anderson et al. | 122/4 D |
| 5,997,824 A | | 12/1999 | Kim | 422/171 |
| 6,361,754 B1 | | 3/2002 | Peter-Hoblyn et al. | 423/213.2 |

* cited by examiner

*Primary Examiner*—Glenn Caldarola
*Assistant Examiner*—Tom P. Duong
(74) *Attorney, Agent, or Firm*—Birch, Stewart, Kolasch & Birch, LLP

(57) ABSTRACT

A NOx removal system for boilers in which the need for any special heat retainer or any warming mechanism is eliminated. Ammonia jet nozzles are disposed on a gas passage of a boiler or flue, and an ammonia generator connected to the jet nozzles is disposed within the flue.

18 Claims, 2 Drawing Sheets

F I G. 1
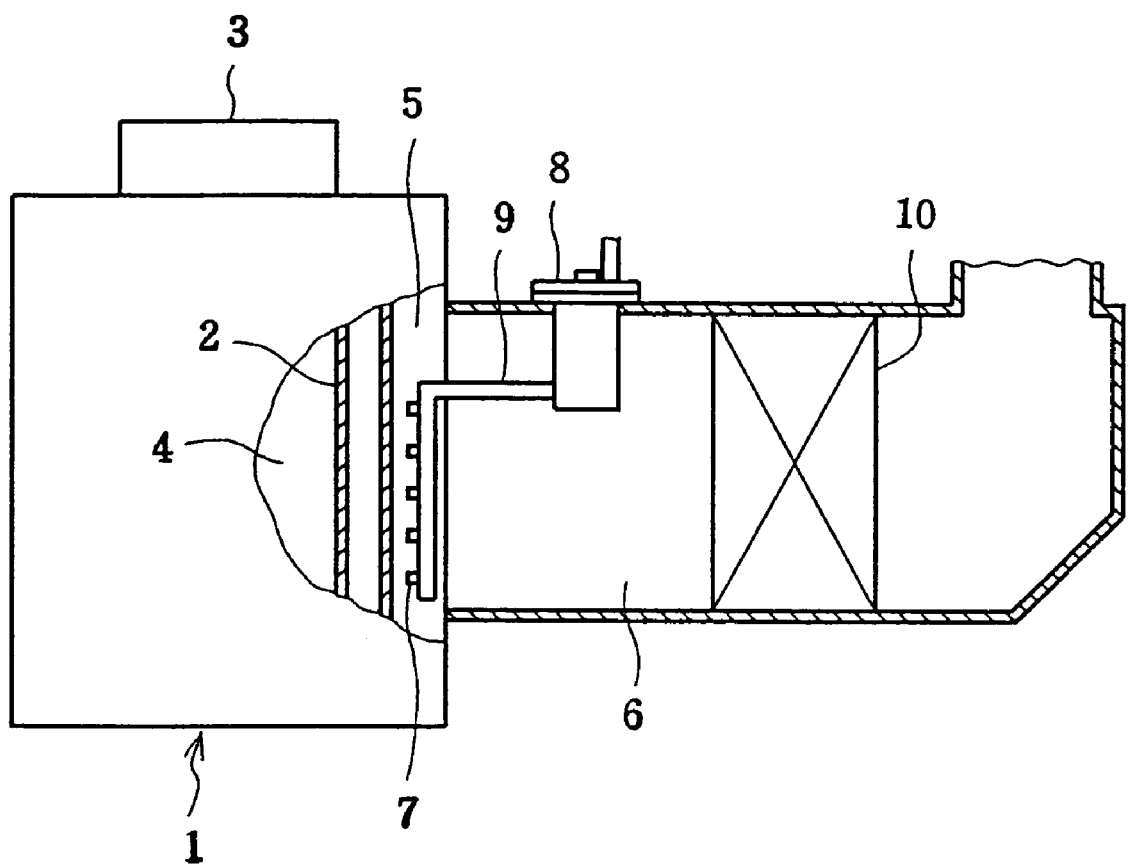

NOX REMOVAL SYSTEM FOR BOILERS

CROSS REFERENCE TO RELATED APPLICATIONS

The present application is a continuation of U.S. application Ser. No. 09/800,926 filed Mar. 8, 2001 now abandoned.

BACKGROUND OF THE INVENTION

The present invention relates to a NOx removal system to be used in boilers for reducing NOx.

In recent years, there has been a desire for further NOx reduction also in boilers. One of the measures therefor is a method that with a NOx removal system provided in the boiler, ammonia as a reductant is supplied to discharge gas, thereby reducing the NOx. While this ammonia is generated by heating urea water, piping from the ammonia generating means to ammonia jet nozzles is provided with heat retention means such as heat insulating material or warming means such as electric heater. This is because ammonia, if decreased in temperature during its flow through the piping, would cause intermediate products to be generated or the piping to be clogged due to crystallization. Such disadvantages tend to occur particularly with the piping longer.

SUMMARY OF THE INVENTION

An object of the present invention is to provide a NOx removal system which eliminates the need for any special heat retention means or warming means.

The present invention, having been accomplished to solve the above object, provides a NOx removal system for boilers, which comprises ammonia jet nozzles disposed on a gas passage of a boiler or flue, and ammonia generating means connected to the jet nozzles and disposed within the flue.

Embodiment of the present invention is described below. This invention is embodied preferably as a NOx removal system for boilers, example, multi-tubular boilers. In the body of the boiler, a combustion chamber is defined, for example, inside heat transfer tube arrays, while an annular gas passage for allowing combustion gas to flow therethrough is disposed outside the annular heat transfer tube arrays. Ammonia jet nozzles are provided at the outlet portion of this gas passage so that ammonia is jetted out into the combustion gas, thereby deoxidizing NOx in the combustion gas by the action of ammonia.

Also in the boiler, a flue is provided in communication with the gas passage, and an ammonia generating means connected to the jet nozzles is provided within the flue. The ammonia generating means is equipped with a heating means such as electric heater and a flow passage through which urea water flows, so that urea water within the flow passage is heated by the heating means, thereby generating ammonia. Part of the flow passage is set in a spiral form, and the heating means is disposed inside this spiral part. Accordingly, urea water flowing through the spiral part is heated by the heating means from inside, and further warmed by discharge gas flowing through the flue from outside. It is noted that urea water is fed to the ammonia generating means together with air, where the air serves to carry urea water and ammonia and to jet out the ammonia from the jet nozzles.

The ammonia generating means and the jet nozzles are connected to each other by an ammonia feed pipe, the ammonia feed pipe also being disposed within the flue. Accordingly, ammonia flowing through the ammonia feed pipe is warmed by discharge gas from outside.

Further, a NOx removal catalyst is provided downstream of the ammonia generating means within the flue. This NOx removal catalyst acts to accelerate the reaction of NOx and ammonia. Accordingly, ammonia and combustion gas mixed at the outlet portion of the gas passage lead to the NOx removal catalyst, where the reaction of NOx and ammonia is accelerated by the NOx removal catalyst. Thus, the NOx in the combustion gas is deoxidized and reduced to a large extent.

The jet nozzles may also be provided on the way of the gas passage. In this case, ammonia can be mixed with combustion gas of relatively high temperature so that the reaction of NOx and ammonia can be accelerated and further that the mixing distance to the NOx removal catalyst can be elongated. Also, the jet nozzles may also be provided within the flue. In this case, the ammonia feed pipe can be shortened in its length.

The boiler body may also be so constituted that a plurality of heat transfer tubes are placed on a linear gas passage through which combustion gas flows, while a burner is provided at one end of the gas passage and the flue is provided at the other end.

Although ammonia is generated by heating urea water in the foregoing constitution, it is also possible to use other compounds that are decomposed by heating or other means to generate ammonia, such as cyanuric acid, melamine and biuret.

As shown above, with the above constitution, the need for any special heat retention means or warming means can be eliminated. That is, the ammonia feed pipe can be maintained at a specified temperature by the heat of discharge gas, which allows a constitution in which neither special heat retention means nor warming means is provided on the ammonia feed pipe. Further, in the ammonia generating means, which is also warmed by the heat of discharge gas from outside, no special heat retention means needs to be provided. Furthermore, the ammonia feed pipe can be made very short in length, and depending on the embodiment, the jet nozzles may be connected directly to the ammonia generating means so that the ammonia feed pipe can be omitted.

BRIEF DESCRIPTION OF THE DRAWINGS

FIG. 1 is an explanatory longitudinal sectional view showing an embodiment of the invention.

DETAILED DESCRIPTION OF THE PREFERRED EMBODIMENTS

Figure 2:
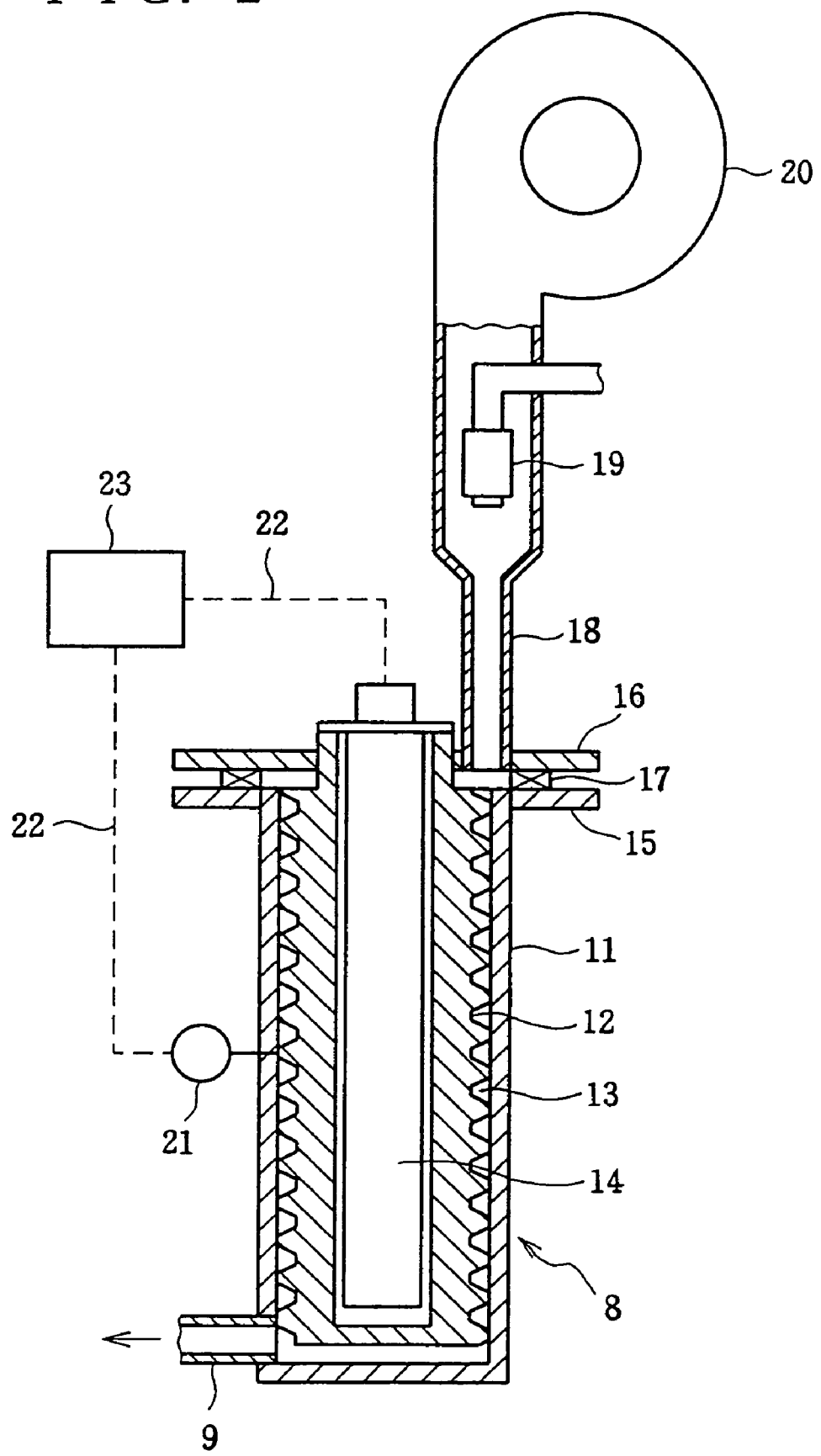
FIG. 2 is an explanatory longitudinal sectional view showing, under magnification, the details of the ammonia generating means of FIG. 1.

Hereinbelow, concrete examples of the present invention are described in detail with reference to the accompanying drawings. In FIG. 1, which shows an embodiment of the invention, a boiler 1 has an upper header (not shown) and a lower header (not shown). Between these two headers, a plurality of heat transfer tubes 2, 2, . . . are arrayed in an annular arrangement. These heat transfer tubes 2 constitute an annular heat transfer tube array, and upper end and lower end of each heat transfer tube 2 are connected to the upper header and the lower header, respectively. Further, a burner 3 is attached on top of the boiler 1, and a combustion chamber 4 is defined inside the annular heat transfer tube arrays. An annular gas passage 5 is provided outside the annular heat transfer tube arrays. Further, a flue 6 is connected to a side wall of the boiler 1 in communication with the gas passage 5.

At the outlet portion of the gas passage 5, a plurality of ammonia jet nozzles 7, 7, . . . are provided. In the embodiment illustrated in the figures, the jet nozzles 7 are set, five in number, along the axes of the heat transfer tubes 2 toward the upstream side of the gas passage 5. That is, the jet nozzles 7 are so positioned that ammonia is jetted out in a direction opposite to the direction in which combustion gas flows through the gas passage 5.

Within the flue 6, an ammonia generating means 8 for heating urea water to generate ammonia is provided. This ammonia generating means 8 is inserted into the flue 6 while fixed to the top wall of the flue 6. The jet nozzles 7 and the ammonia generating means 8 are connected to each other by means of an ammonia feed pipe 9. That is, ammonia generated by the ammonia generating means 8 is fed to the jet nozzles 7 via the ammonia feed pipe 9. In this case, the ammonia feed pipe 9 is also set within the flue 6.

Further, a NOx removal catalyst 10 is provided downstream of the ammonia generating means 8 within the flue 6. This NOx removal catalyst 10 acts to accelerate the reaction of NOx and ammonia.

Next, details of the ammonia generating means 8 are explained with reference to FIG. 2. As shown in FIG. 2, a screw-like member 12 is inserted inside a cylindrical member 11, forming a spiral flow passage 13. More specifically, the screw-like member 12 is a so-called trapezoidal screw, in which threads trapezoidal in section are provided on the outer peripheral surface of the screw, the threads each having a top portion in contact with the cylindrical member 11, and screw grooves forming the flow passage 13. Further, an electric heater 14 as a heating means is provided inside the screw-like member 12 so that urea water, while flowing through the flow passage 13, is heated and decomposed by the electric heater 14, thus forming gaseous ammonia continuously.

A first flange 15 is provided at an upper end portion of the cylindrical member 11, and a second flange 16 is provided at an upper end portion of the screw-like member 12. Therefore, when the screw-like member 12 is inserted and fixed to within the cylindrical member 11, the two flanges 15, 16 are overlaid on each other with a gasket 17 interposed therebetween and tightened together with a proper tightening means such as bolt or nut (not shown).

A urea water inlet tube 18 is connected to the first flange 15 in communication with the flow passage 13. The urea water inlet tube 18 has a urea water inlet nozzle 19 coaxially provided on its larger-diameter portion. A blower 20 is connected to an upstream-side end portion of the urea water inlet tube 18. Air from this blower 20 acts to carry urea water and ammonia and to jet out ammonia from the jet nozzles 7. A urea water tank and a urea water feed pump (neither shown) are connected to the urea water inlet nozzle 19. For example, urea water of about 20% concentration is introduced at a flow rate of about 10 milliliters per minute from the urea water inlet nozzle 19, and air is fed at a flow rate of about 30 liters per minute from the blower 20. In this case, the amount of introduced urea water is controlled according to the amount of generated NOx in the boiler 1.

The ammonia feed pipe 9 is connected to a lower end portion in the side wall of the cylindrical member 11 in communication with the flow passage 13.

Further, the screw-like member 12 is provided with a temperature sensor 21 for detecting surface temperature of the screw-like member 12, and this temperature sensor 21 and the electric heater 14 are connected to a controller 23 via electric cable 22, 22. Accordingly, by detecting the surface temperature of the screw-like member 12 with the temperature sensor 21, electric energy supplied to the electric heater 14 is controlled by the controller 23 so that the surface temperature of the screw-like member 12 becomes about 500 degrees C.

The above-described constitution is now explained in its operation. When the burner 3 is operated, gas under a combustion reaction, i.e. combustion gas in a flame state, arises in the combustion chamber 4. This flame-state combustion gas, after generally completing its combustion reaction in the combustion chamber 4, flows into the gas passage 5. This combustion gas flows through the gas passage 5, and thereafter discharged outside through the flue 6 as discharge gas.

With the burner 3 keeping in operation, when the ammonia generating means 8 is operated, ammonia is jetted out through the jet nozzles 7 via the ammonia feed pipe 9. The ammonia jetted out from the jet nozzles 7 is mixed with combustion gas at the outlet portion of the gas passage 5. At this time point, ammonia is jetted out in a direction opposite to the flow direction of the combustion gas, which accelerates the mixing of ammonia and combustion gas. Then, the ammonia and combustion gas mixture leads to the NOx removal catalyst 10, where the reaction of NOx and ammonia is accelerated by the NOx removal catalyst 10. Thus, the NOx in the combustion gas is deoxidized and reduced to a large extent.

In this connection, the ammonia generating means 8, which is provided within the flue 6, is warmed from outside by heat of discharge gas (about 300° C.) during the operation of the burner 3. Accordingly, there can be realized a constitution in which no special heat retention means such as heat insulating material is provided on the outer periphery of the ammonia generating means 8. Further, since the urea water flowing through the flow passage 13 receives the heat of the discharge gas from outside, power consumption of the electric heater 14 can be saved.

The provision of the ammonia generating means 8 within the flue 6 allows the ammonia feed pipe 9 to be very short in length. The ammonia feed pipe 9 also receives the heat of the discharge gas from outside, thereby being warmed, and therefore may be provided in a constitution in which neither special heat retention means such as heat insulating material nor special warming means such as electric heater is provided on the ammonia feed pipe 9. Also, the ammonia feed pipe 9 can securely be prevented from blockage due to generation of unnecessary intermediate products or crystallization.

Further, in the ammonia generating means 8, the flow passage 13 is formed only by inserting and fixing the screw-like member 12 into the cylindrical member 11, hence an easy-to-assemble structure. Even if blockage has occurred due to crystallization of urea water within the flow passage 13, the outer peripheral surface of the screw-like member 12 and the inner peripheral surface of the cylindrical member 11 can be cleaned very simply with the screw-like member 12 withdrawn and removed.

According to this invention, the need for any special heat retention means or warming means can be eliminated in NOx removal systems for boilers.

What is claimed is:

1. A boiler comprising:
a boiler body;
an array of heat transfer tubes mounted inside the boiler body;
a gas passage in the boiler body partially defined by the array;
a flue connected to the boiler body for carrying exhaust gasses away from the boiler body, and
a NOx removal system comprising at least one ammonia jet nozzle disposed in the gas passage in the boiler body, proximate to the flue, and a heater disposed within the flue for generating ammonia by heating a liquid, the heater being connected to the at least one ammonia jet nozzle disposed within the boiler body, wherein the heater absorbs additional heat from the exhaust gasses in the flue to facilitate generating ammonia, thereby reducing power consumption.

2. The device of claim 1 wherein said at least one ammonia jet nozzle comprises a plurality of ammonia jet nozzles mounted on a manifold supplying ammonia gas to the plurality of jets, said heater comprises a housing spaced from said manifold and having an outlet, and including a pipe connecting the heater outlet to the manifold.

3. The device of claim 2 wherein said pipe is disposed in the flue.

4. The device of claim 3 wherein said pipe includes a sidewall exposed to exhaust gasses in the flue whereby the exhaust gasses heat the interior of the pipe.

5. The device of claim 1 wherein said heater comprises a housing having an inlet, an outlet, and a spiral flow passageway connecting said inlet and said outlet.

6. The device of claim 5 wherein said spiral flow passageway is defined in part by a screw member.

7. The device of claim 6 wherein said screw member comprises a trapezoidal screw member.

8. The device of claim 5 wherein said spiral flow passageway is defined by the housing and a screw member fixedly mounted in the housing interior.

9. The device of claim 8 including an electric heating element disposed in an interior of said screw member.

10. The device of claim 5 including a blower blowing a liquid into the inlet.

11. A boiler comprising:
a boiler body;
an array of heat transfer tubes mounted inside the boiler body;
a gas passage in the boiler body partially defined by the array;
a flue connected to the boiler body for carrying exhaust gasses away from the boiler body in a down stream direction, and
a NOx removal system comprising a heater for generating ammonia by heating a liquids, and at least one ammonia jet nozzle disposed in the boiler body, proximate the flue, the heater being disposed in the flue upstream of the at least one ammonia jet nozzle and connected to the at least one ammonia jet nozzle by a pipe disposed at least partially within the flue, wherein the heater absorbs additional heat from the exhaust gasses in the flue to facilitate generating ammonia, thereby reducing power consumption.

12. The device of claim 11 wherein said at least one ammonia jet nozzle comprises a plurality of ammonia jet nozzles mounted on a manifold supplying ammonia gas to the plurality of jets, said heater comprises a housing spaced from said manifold and having an outlet, and including a pipe connecting the heater outlet to the manifold.

13. The device of claim 12 wherein said pipe is disposed in the flue.

14. The device of claim 13 wherein said pipe includes a sidewall exposed to exhaust gasses in the flue whereby the exhaust gasses heat the interior of the pipe.

15. The device of claim 11 wherein said heater comprises a housing having an inlet, an outlet, and a spiral flow passageway connecting said inlet and said outlet.

16. The device of claim 15 wherein said spiral flow passageway is defined in part by a screw member.

17. The device of claim 15 including an electric heating element disposed in an interior of said screw member.

18. The device of claim 17 including a blower blowing a liquid into the inlet.

* * * * *